United States Patent [19]
Wögerer

[11] Patent Number: 4,586,597
[45] Date of Patent: May 6, 1986

[54] APPARATUS FOR FEEDING PLATELIKE WORKPIECES TO A TOOL STATION OF A MACHINE TOOL

[75] Inventor: Wolfgang Wögerer, Liebenau, Austria

[73] Assignee: Voest-Alpine Aktiengesellschaft, Linz, Austria

[21] Appl. No.: 692,526

[22] Filed: Jan. 18, 1985

[30] Foreign Application Priority Data

Feb. 10, 1984 [AT] Austria .................................. 428/84

[51] Int. Cl.$^4$ ............................................. B65G 21/20
[52] U.S. Cl. .................. 198/345; 198/346.1; 269/73; 408/91
[58] Field of Search .................. 198/345, 346.1, 339.1, 198/606; 408/90, 91, 98; 409/219; 260/65, 274, 279; 83/373, 648; 269/73

[56] References Cited

U.S. PATENT DOCUMENTS

| | | | |
|---|---|---|---|
| 3,232,141 | 4/1966 | Swanson et al. | 408/90 |
| 4,096,936 | 6/1978 | Nielsen. | |
| 4,106,183 | 8/1978 | Brolund et al. | 266/65 X |
| 4,523,749 | 6/1985 | Kindgren et al. | 269/73 X |

FOREIGN PATENT DOCUMENTS 3141305  6/1982  Fed. Rep. of Germany.

*Primary Examiner*—Joseph E. Valenza
*Assistant Examiner*—Michael Stone
*Attorney, Agent, or Firm*—Kurt Kelman

[57] ABSTRACT

Apparatus for feeding platelike workpieces to a tool station of a machine tool comprises a frame carrying a straight track, and a carriage, which is guided by said track and carries transverse conveying means for conveying the workpieces. In order to ensure that the workpieces will be properly supported, the transverse conveying means comprise at least one pair of endless conveyors, which are arranged one behind the other in their direction of travel and are adapted to support a workpiece. The endless conveyors of said pair or of each of said pairs are spaced apart in their direction of travel to provide an adequate space for the operation of the tools of the tool station, or at least one endless conveyor of said pair or of each of said pairs is mounted on a carrier, which is movable relative to the carriage in the direction of travel of said endless conveyors.

14 Claims, 1 Drawing Figure

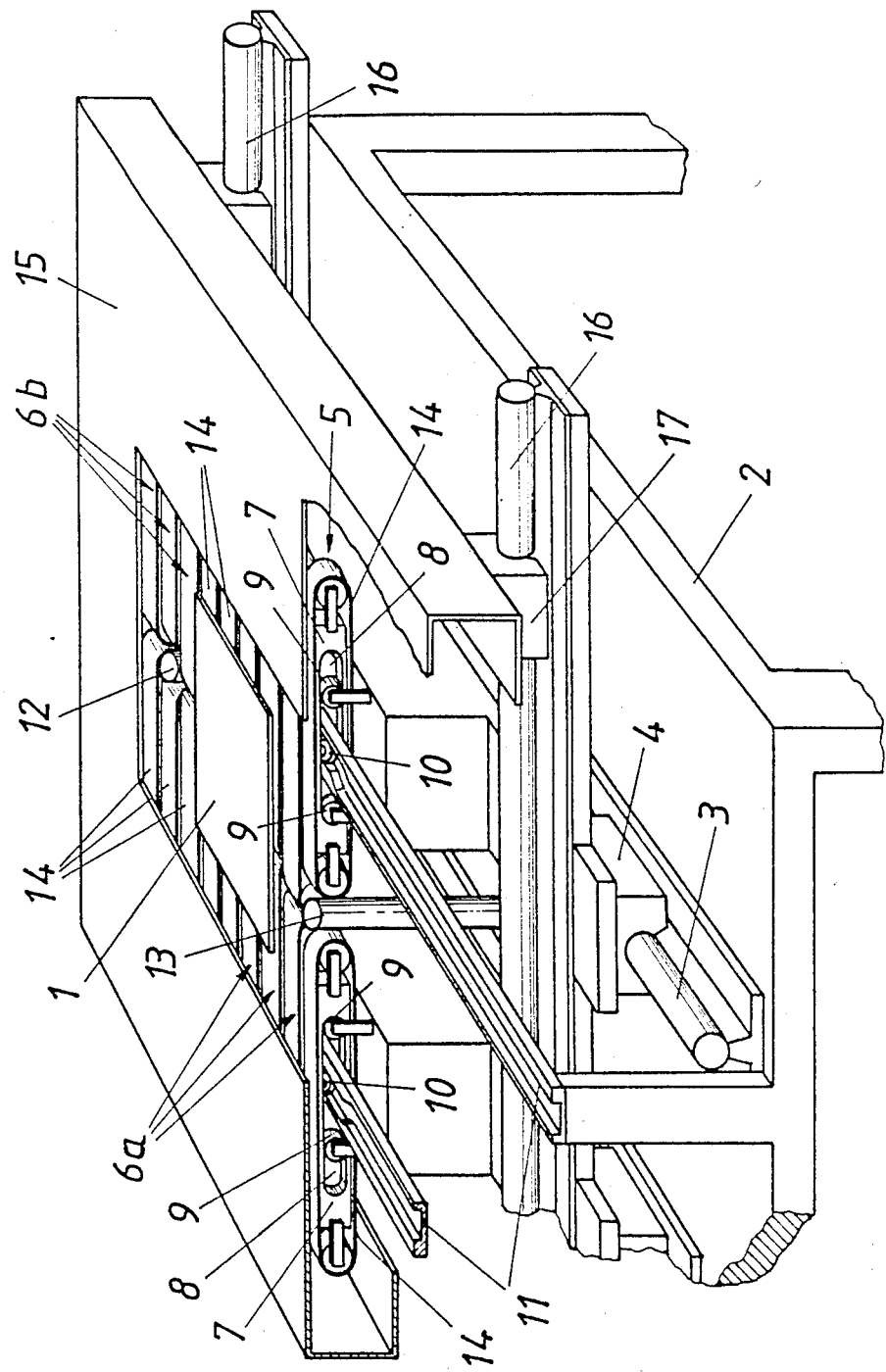

APPARATUS FOR FEEDING PLATELIKE WORKPIECES TO A TOOL STATION OF A MACHINE TOOL

FIELD OF THE INVENTION

This invention relates to apparatus for feeding platelike workpiece to a tool station of a machine tool, comprising a frame, a carriage movable on a straight track, which is mounted on said frame, and transverse conveying means carried by said carriage and extending transversely to said track and adapted to support the workpieces.

DESCRIPTION OF THE PRIOR ART

Because tools for cutting, stamping or drilling workpieces require a certain working space, the known apparatus of the kind described hereinbefore include a deck, which serves to guide the workpiece and is provided with an aperture adjacent to the tool station of the machine tool. Owing to that aperture, the guide deck will not interfere with the operation of the tools. On the other hand, the workpiece must be displaced relative to the guide deck so that the surface of the workpiece may be damaged.

In order to avoid that disadvantage, Laid-open German Application No. 31 41 305 discloses apparatus in which the workpiece to be machined lies on a grate, which is supported on the deck and can be moved by a positioning drive along two axes, which are at an angle to each other. For this purpose a straight track is mounted on the deck, a carriage is movable along said track, and a cross slide provided with grippers for gripping the grate is mounted on the carriage and movable thereon transversely to said track. In such an arrangement the grate can be moved along one axis by the carriage and along the other axis by the cross slide so that the workpiece can be moved to the desired position without a displacement of the workpiece relative to the surface on which said workpiece is supported. Whereas that apparatus avoids damage to the surface if the workpiece as the latter is displaced, the grate will restrict the working space of the tools so that it is impossible to perform an operation which requires a cooperation of two tools acting on the workpiece from opposite sides.

U.S. Pat. No. 4,096,936 discloses a mailsorting conveyor which comprises a composite carriage, which is constituted by a plurality of juxtaposed and closely spaced apart transverse conveyors and is movable on a rail. Each dependence on the direction of travel of the several transverse conveyors the mail items to be sorted can be moved to one longitudinal side or the other of the carriage and can be discharged there to fall into respective receptacles.

SUMMARY OF THE INVENTION

It is an object of the invention so to improve apparatus which is of the kind described first hereinbefore that the advantage residing in the provision of an unrestricted space for the operation of the tools employed in the machine tool is combined with the advantage residing in that the workpiece will be properly supported and can be moved without a relative movement between the workpiece and the surface on which the workpiece is supported.

This object is accomplished in accordance with the invention in that the transverse conveying means comprise at least one pair of endless conveyors, which are arranged one behind the other in their direction of travel and constitute a support for the workpieces and are either sufficiently spaced apart to provide between them an adequate space for the operation of the tools of the machine tool or at least one of the endless conveyors of said pair is mounted on a carrier, which is mounted on the carriage to be adjustable in the direction of travel of the endless conveyors.

Because the transverse conveying means comprise at least one pair of endless conveyors, which are arranged one behind the other and constitute a support for the workpieces, each workpiece can be moved transversely to the straight track for the carriage without a change of the position of the transverse conveying means relative to the carriage. The revolving conveying elements preferably consist of conveyor belts and carry the workpiece along without a slip so that the workpieces will not perform a movement relative to the conveying elements which are in contact with the workpieces and the surfaces of the workpieces in contact with such conveying elements cannot be damaged by such relative movement. For this reason the arrangement of the endless conveyors on the carriage can be selected in accordance with the space required for the operation of the tools. For this purpose the endless conveyors of said pair or of each of said pairs are sufficiently spaced apart to provide between them the space required for the operation of the tools of the machine tool or the endless conveyors of said pair or of each of said pairs are so adjusted that they are sufficiently spaced apart adjacent to the tools and such adjustment is permitted in that in said pair or each of said pairs at least one endless conveyor disposed on one side of the carriage is mounted on a carrier, which is adjustable in the direction of travel of the transverse conveying means. As the carriage is moved toward the tool station, the tool or tools of the machine tool will always be adequately spaced apart from each of the endless conveyors, whether the latter are inherently spaced on adequate distance apart or are adjusted adjacent to the tool station so that they are adequately apart. During an adjustment of the carrier or carriers for the endless conveyors, the position of the conveying elements which contact the workpiece is not changed relative to the workpiece because the conveying elements are driven to convey the workpiece rather than to adjust the carrier or carriers. In this manner the two endless conveyors which are arranged one behind the other can be moved apart to provide adequate space between them for the operation of the tools without a need for a change of the position of the workpiece relative to the carriage.

The embodiment in which the endless conveyors are moved apart before they are close to the tool station affords the advantage that the workpieces can be supported on a substantially continuous surface before they have been moved to the tool station. This will not be possible if the endless conveyor are permanently spaced a predetermined distance apart. The above-mentioned advantage will be particularly useful if the transverse conveying means comprise a plurality of juxtaposed pairs of endless conveyors so that said endless conveyors constitute two sets, which are arranged one behind the other in the direction of travel of the endless conveyors, and each of the endless conveyors of at least one of said sets is mounted on an adjustable carrier. Because each set comprises a plurality of juxtaposed endless conveyors, it is possible to move the endless conveyors apart only when they are close to said tool station whereas the workpiece is continuously supported on the remaining endless conveyors, which have not been moved apart. If the endless conveyors of both sets can be moved apart, it will be sufficient to adjust each of said conveyors only over a relatively short distance so that the adjustment can be effected in a relatively short time.

A particularly simple design can be obtained in that the adjustably mounted carriers for the endless conveyors are guided by cam tracks, which are fixed relative to the frame and extend transversely to the direction of travel of the endless conveyors and deviate from the direction of the straight track for the carriage and which ensure that the desired adjustment will be imparted to the carrier in dependence on the displacement of the carriage. In such an arrangement the carriers are constrained to move along the cam track so that any deviation of the cam track from the direction of movement of the carriage will result in a transverse movement of the carrier.

Various means may be employed to drive the endless conveyors because such drive means are required to impart to the conveying elements only the movements required for a movement of the workpieces in the transverse direction relative to the carriage, independently of the adjustment of the carriers. In a particularly desirable arrangement the upper courses of the revolving conveying elements of the endless conveyors are operatively connected to a common positioning drive. When the upper courses are held in position relative to the carriage by the positioning drive, the carriers for the endless conveyors can be adjusted as desired without a need for an additional control of the means for driving the endless conveyors.

The positioning drive may comprise a coupling member, which is mounted on the carriage so as to be movable relative thereto in the direction of travel of the endless conveyors and adapted to drive the revolving conveying elements. If the coupling member which is connected to the conveying elements of the endless conveyors constitutes a cross slide, such cross slide can be used to control the movement of the workpieces in the conventional manner and all advantages stated hereinbefore will then be afforded.

BRIEF DESCRIPTION OF THE DRAWING

The drawing is a simplified perspective view, partly torn open, and shows apparatus which embodies the invention and serves to feed platelike workpieces to a tool station of a machine tool.

DESCRIPTION OF THE PREFERRED EMBODIMENT

The illustrated apparatus for feeding platelike workpieces 1 to a tool station of a machine tool comprises a frame 2, which carries a straight track 3, and a carriage 4, which is movable on the track 3 along the latter. Transverse conveying means 5 for conveying the workpieces 1 are mounted on the carriage 4. Said transverse conveying means 5 comprise a plurality of juxtaposed pairs of endless conveyors 6a and 6b, respectively. The endless conveyors of each said pairs are arranged one behind the other in the direction of travel of the endless conveyors 6a, 6b, so that the endless conveyors 6a constitute one set of such conveyors and the endless conveyors 6b constitute another set thereof. Each of said endless conveyors is mounted on a carrier 7, which is mounted on the carriage 4 and movable thereon in the direction of travel of the endless conveyors 6a and 6b. For this purpose each carrier 7 has a guide slot 8, which receives a plurality of supporting rollers 9, which are mounted on the carriage 4. Each carrier 7 is also provided with cam follower roller 10, which is guided in an associated cam track 11, which consists of two rails mounted on the frame 2. As the carriage 4 is moved along the straight track 3, the endless conveyors 6a, 6b of each pair of endless conveyors aligned in their direction of travel are moved apart or toward each other in dependence on the configuration of the cam track. Such apparatus can be used to feed platelike workpieces in a machine tool to a tool station which comprises, e.g., a tool (not shown) for acting on a platelike workpiece on one side thereof and a second tool 12 for acting on the platelike workpiece on the other side in cooperation with the first-mentioned tool, or a tool station including, e.g., a cutting plasma torch (not shown) and a exhaust gas pipe 13 associated with such torch. For this purpose the apparatus is so arranged that the carriage 4 can move at least part of the endless conveyors 6a, 6b of each set to positions adjacent to said tool station. This is possible because the carriers 7 can be adjusted relative to the carriage 4 so that those endless conveyors 6a, 6b which are close to said stationary tool station are moved apart to provide an adequate space for the operation of the tools.

In the embodiment shown by way of example the endless conveyors 6a, 6b consist of revolving conveying elements 14 and are driven by a positioning drive, which comprises a framelike coupling member 15 that is operatively connected to the upper courses of all conveying elements 14 and guided in the direction of travel of the endless conveyors 6a, 6b by a track 16, which is mounted on the carriage 4 and extends in the direction of travel of the endless conveyors 6a, 6b. As the coupling member 15 is moved along the track 16, a workpiece 1 which contacts the endless conveyors 6a and 6b on its entire undersurface or on part thereof will be moved with the coupling member 15 relative to the associated carrier 7 without a slip between the workpiece and the conveying elements 14 so that a movement of the workpiece 1 relative to the conveying elements 14 as well as damage to the undersurface of such workpiece will be prevented. The carriers 7 for the endless conveyors 6a, 6b will move along the track 3 in unison with the carriage 4 and such movement will cause the endless conveyors 6a, 6b to be moved apart as they approach the tool station, so that parts of the tool station can extend between the endless conveyors 6a, 6b. But that movement of the endless conveyors 6a, 6b apart from each other will not involve a movement of the workpiece 1 relative to the upper courses 14 of the conveying elements 14 because said upper courses are held in position relative to the carriage 4 by the coupling member 15.

It is apparent from the drawing that the coupling member 15 constitutes a cross slide 17, by which the transverse adjustment of the workpieces 1 can be controlled in the conventional manner because the movement of the cross slide 17 corresponds to the movement of the workpiece.

I claim:

1. In apparatus for feeding a platelike workpiece to and from a tool station of a machine tool, comprising a frame, a straight track carried by said frame and extending in a first direction, a carriage carried by said frame and movable along and guided by said track, and transverse conveying means carried by said carriage and adapted to support a workpiece and operable to move said workpiece in a direction of travel, which is transverse to said first direction, the improvement residing in that said transverse conveying means comprise at least one pair of revolvable endless conveyors, which are arranged one behind the other in said direction of travel and have an upper course each, spacing means are provided for holding said endless conveyors of said pair spaced apart in said direction of travel, and position control means are provided for revolving said endless conveyors and for holding said upper courses of said endless conveyors of said pair against a movement relative to each other in said direction of travel.

2. The improvement set forth in claim 1, wherein said spacing means comprise means by which said endless conveyors are held against a bodily movement in said direction of travel relative to said carriage.

3. The improvement set forth in claim 1, wherein at least one endless conveyor of said pair is an adjustable endless conveyor and is mounted on a carrier, which is mounted on said carriage and movable relative to said carriage in said direction of travel, said adjustable endless conveyor is arranged to be bodily moved in unison with said carrier as the latter is moved in said direction of travel relative to said carriage, and said position control means are arranged to hold a portion of said upper course of said adjustable endless conveyor in position relative to said carriage during a movement of said carrier relative to said carriage in said direction of travel.

4. The improvement set forth in claim 3, wherein each of said endless conveyors of said pair is mounted on an associated carrier, which is mounted on said carriage and movable relative to the other of said carriers in said direction of travel.

5. The improvement set forth in claim 4, wherein said position control means comprise a common drive, which is operatively connected to both said endless conveyors and arranged to impart equal and opposite movements in said second direction to said upper courses of said endless conveyors of said pair relative to the associated carriers in response to and in compensation of equal and opposite movements of said carriers relative to said carriage in said direction of travel.

6. The improvement set forth in claim 5, wherein said common drive comprises a coupling member, which is slidably mounted on said carriage and movable relative to said carriage and to said carriers in said direction of travel and adapted to be driven in said direction of travel and operatively connected to both endless conveyors of said pair.

7. The improvement set forth in claim 3, wherein said endless conveyors constitute first and second sets of said endless conveyors, said first and second sets are arranged one behind the other in said direction of travel, each of said sets comprises one endless conveyor of each of a plurality of said pairs, and each of said endless conveyors of one of said sets is mounted on one of said carriers, and each of said carriers is movable in said direction of travel relative to any other of said carriers.

8. The improvement set forth in claim 7, wherein each of said endless conveyors is mounted on one of said carriers.

9. The improvement set forth in claim 8, wherein two cam tracks are provided, which are fixed to said frame and extend transversely to said first direction, each of said cam tracks is operatively connected to said carriers which are associated with said endless conveyors of one of said sets, and said cam tracks are arranged to impart equal and opposite movements in said direction of travel to said carriers associated with each of said pairs, independently of the others of said carriers, in response to a movement of said carriage in said first direction.

10. The improvement set forth in claim 8, wherein said position control means comprise a common drive, which is operatively connected to all said endless conveyors and arranged to impart equal and opposite movements in said second direction to said upper courses of said endless conveyors.

11. The improvement set forth in claim 10, wherein said common drive comprises a coupling member, which is slidably mounted on said carriage and movable relative to said carriage and to said carriers in said direction of travel and adapted to be driven in said direction of travel and operatively connected to all said endless conveyors.

12. The improvement set forth in claim 8, wherein a cam track is provided, which is fixed to said frame and extends transversely to said first direction and is arranged to move each of said carriers in said direction of travel in response to a movement of said carriage in said first direction.

13. The improvement set forth in claim 3, wherein a cam is provided, which is fixed to said frame and operatively connected to said carrier and arranged to move said carrier in said direction of travel in response to a movement of said carriage along said track.

14. The improvement set forth in claim 13, wherein said common drive comprises a coupling member, which is slidably mounted on said carriage and movable relative to said carriage in said direction of travel and adapted to be driven in said direction of travel and operatively connected to both endless conveyors of said pair.

* * * * *